(12) United States Patent
Jin et al.

(10) Patent No.: US 7,564,829 B2
(45) Date of Patent: Jul. 21, 2009

(54) ALLOCATION OF RADIO RESOURCE IN ORTHOGONAL FREQUENCY DIVISION MULTIPLEXING SYSTEM

(75) Inventors: Yongseok Jin, Anyang-si (KR); Jinyoung Chun, Seoul (KR); Bin-Chul Ihm, Anyang-si (KR)

(73) Assignee: LG Electronics, Inc., Seoul (KR)

( * ) Notice: Subject to any disclaimer, the term of this patent is extended or adjusted under 35 U.S.C. 154(b) by 587 days.

(21) Appl. No.: 11/166,828

(22) Filed: Jun. 23, 2005

(65) Prior Publication Data

US 2005/0286408 A1  Dec. 29, 2005

(30) Foreign Application Priority Data

Jun. 25, 2004 (KR) .................. 10-2004-0048436
Jul. 8, 2004  (KR) .................. 10-2004-0053139
Dec. 31, 2004 (KR) .................. 10-2004-0118087

(51) Int. Cl.
*H04B 7/216* (2006.01)

(52) U.S. Cl. .............. 370/343; 370/321; 370/347; 370/464; 370/344; 370/480

(58) Field of Classification Search .............. 370/343, 370/321, 347, 464, 344, 480, 328, 430
See application file for complete search history.

(56) References Cited

U.S. PATENT DOCUMENTS 6,112,094 A * 8/2000 Dent .................. 455/452.1

6,285,663 B1 * 9/2001 Esmailzadeh .............. 370/311
6,545,997 B1   4/2003 Bohnke et al.
6,553,021 B1 * 4/2003 Bishop et al. ............. 370/347
6,947,476 B2 * 9/2005 Song .................... 375/149
2005/0030964 A1 * 2/2005 Tiedemann et al. ......... 370/431
2007/0053282 A1 * 3/2007 Tong et al. ............... 370/208

FOREIGN PATENT DOCUMENTS

| KR | 10-2005-0040058 | 10/2003 |
| KR | 2005-40058 A | 5/2005 |
| WO | WO 2004-38988 A2 | 5/2004 |
| WO | WO2004038988 | 5/2004 |

* cited by examiner

*Primary Examiner*—Alexander Eisen
*Assistant Examiner*—Julio R Perez
(74) *Attorney, Agent, or Firm*—Lee, Hong, Degerman, Kang & Waimey

(57) ABSTRACT

An uplink capacity is increased by a method in which more than two mobile stations simultaneously use a radio resource allocated to one mobile station. A method of allocating a radio resource in an orthogonal frequency division multiplexing system comprises receiving data associated with a radio resource allocation map from a base station, wherein the radio allocation map comprises control parameters for transmitting uplink data to the base station. The control parameters comprises orthogonal pilot pattern indicator for using orthogonal pilot patterns associated with supporting at least concurrent dual transmission by at least one mobile station, and for use in the same frequency band and same time duration. The orthogonal pilot patterns comprises at least a minus pilot being used for an uplink basic allocation unit. The mobile station then transmits uplink data to the base station by using the orthogonal pilot patterns.

11 Claims, 12 Drawing Sheets

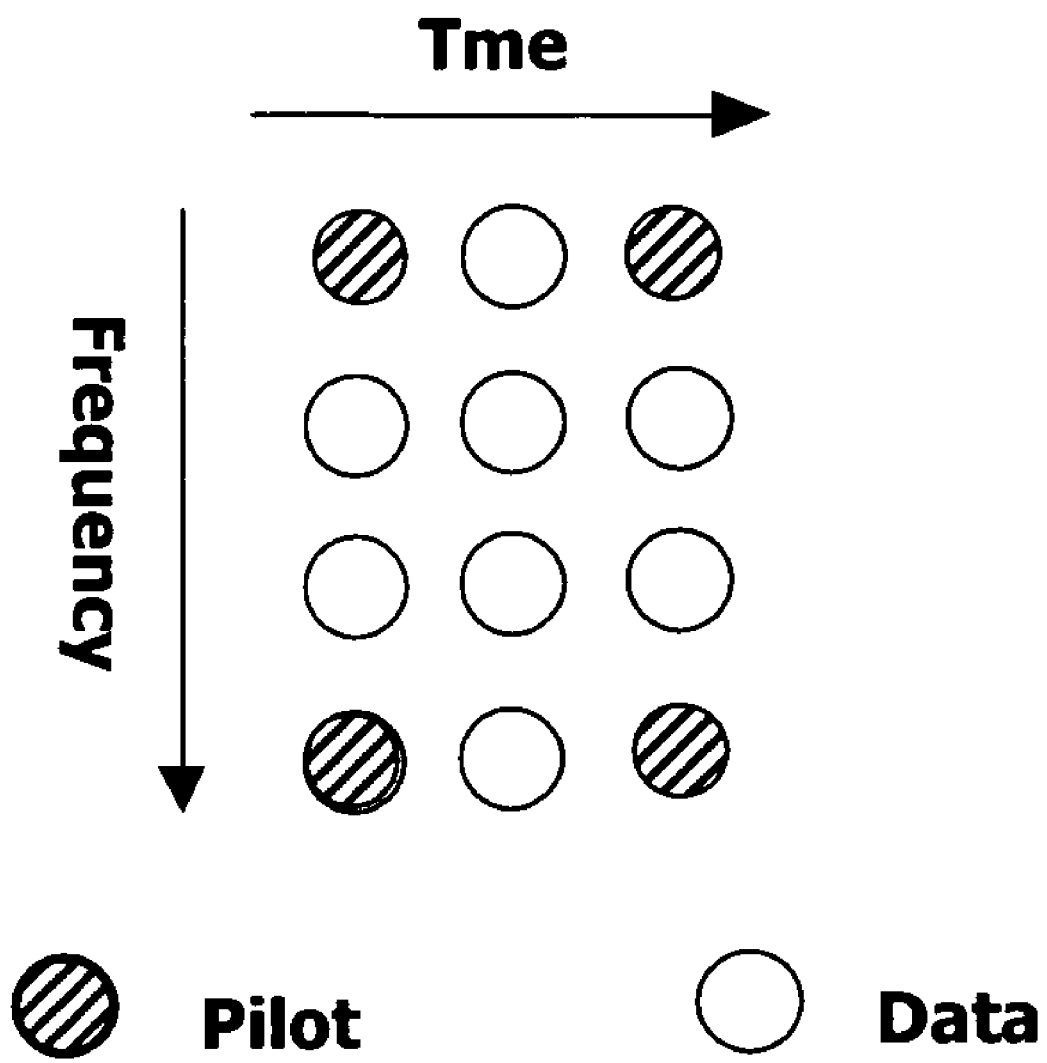

Pattern 4

⊘ Pilot for first user     ● Pilot for second user     ○ Data

|  | $X_1$ | $X_2$ | $X_3$ | $X_4$ | Pilot Pattern |
|---|---|---|---|---|---|
| User 1 in Pattern 1,2,3 | 1 | Null | Null | 1 | B |
| User 2 in Pattern 1,2,3 | Null | 1 | 1 | Null | A |
| User 1 in Pattern 4 | 1 | 1 | -1 | -1 |  |
| User 2 in Pattern 4 | 1 | -1 | 1 | -1 |  |
| User 1 in Pattern 1 | -1 | Null | Null | 1 | D |
| User 2 in Pattern 1 | Null | -1 | 1 | Null | C |

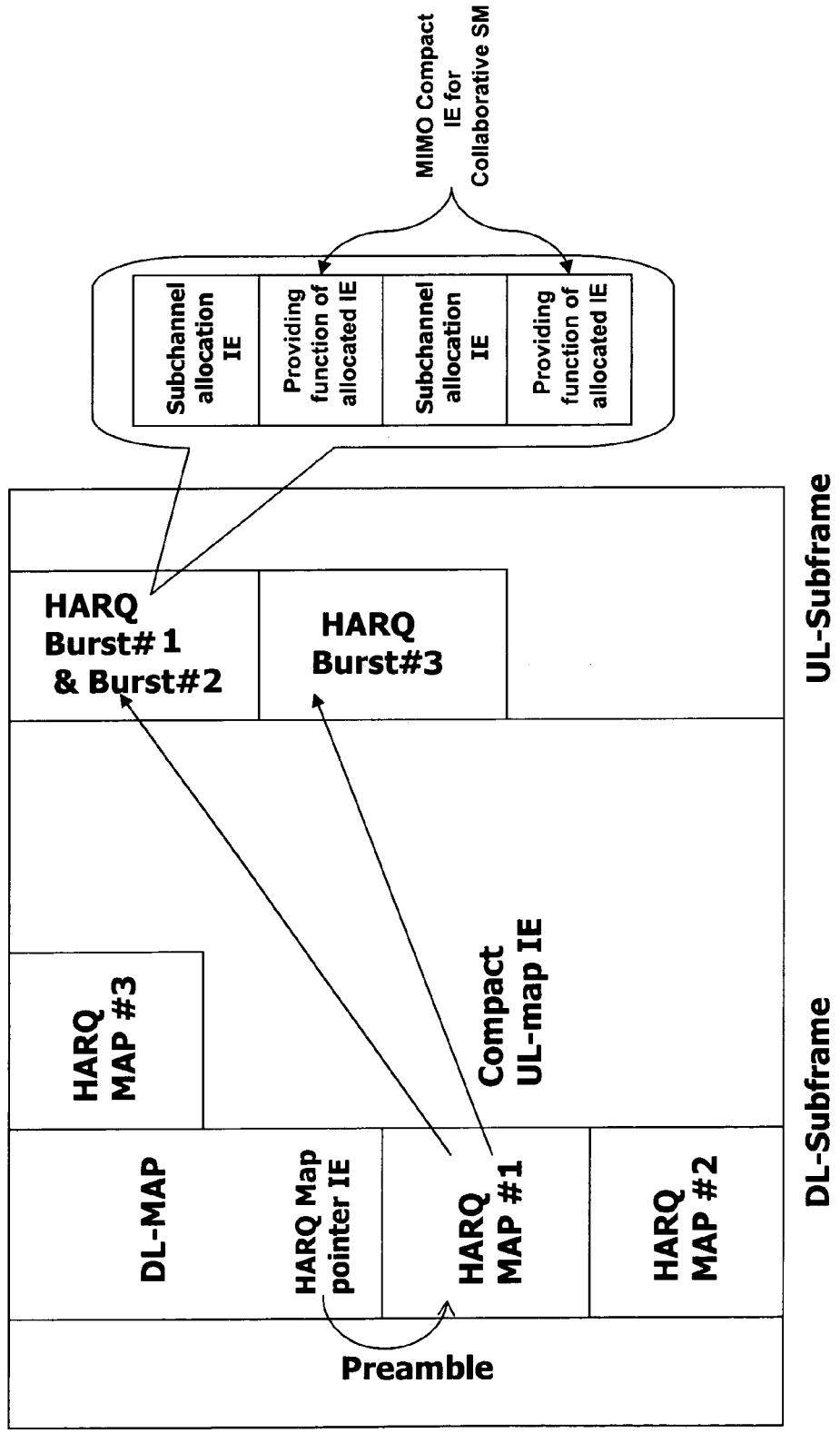

ALLOCATION OF RADIO RESOURCE IN ORTHOGONAL FREQUENCY DIVISION MULTIPLEXING SYSTEM

CROSS-REFERENCE TO RELATED APPLICATIONS

Pursuant to 35 U.S.C. § 119(a), this application claims the benefit of earlier filing date and right of priority to Korean Application Nos. 10-2004-0048436, 10-2004-0053139, 10-2004-0118087, filed on Jun. 25, 2004, Jul. 8, 2004 and Dec. 31, 2004, respectively, the contents of which are hereby incorporated by reference herein in their entirety.

FIELD OF THE INVENTION

The present invention relates to an OFDMA (Orthogonal Frequency Division Multiplexing Access) type system, and particularly, to allocation of radio resources in the OFDMA system.

BACKGROUND OF THE INVENTION

In an OFDM system, a high speed serial signal is divided into several parallel signals and are modulated using orthogonal sub-carriers for transmission and reception. Therefore, the orthogonal sub-carrier divided into narrow bandwidths undergoes a flat fading and accordingly has excellent characteristics for a frequency selective fading channel. Since a transmitting device maintains orthogonality between sub-carriers by using a simple method such as a guard interval interleaving, a receiving device does not need a complicated equalizer or a rake receiver generally used in a DS-CDMA (Direct Sequence-Code Division Multiplexing Access) method. The OFDM system with such advanced characteristics has been adopted as a standardized modulation type in a radio LAN, such as IEEE802.11a or HIPERLAN, and a fixed broadband wireless access, such as IEEE802.16. The OFDM system has once been investigated as one of applicable technologies of a modulation and demodulation/multiple access method in a UMTS (Universal Mobile Telecommunications system).

Recently, various multiple access methods based on the OFDM have been actively researched. The OFDMA system has been actively investigated and studied as a promising candidate technology for achieving a next generation mobile communication satisfying with user requirements remarkably enlarged such as an ultra high speed multimedia service. The OFDMA system uses a two dimensional access method by coupling a time division access technology to a frequency division access technology.

FIG. 1 illustrates an allocation of a radio resource according to the conventional art. Referring to FIG. 1, in a radio communications system, many users divide and use limited uplink/downlink radio resources. However, many users do not divide and use a radio resource that is allocated to one user. That is, there may not exist any method in which the same resource is allocated to two or more users.

For instance, in a TDMA (Time Division Multiplexing Access) system, a certain time interval is allocated to a user, and accordingly a scheduling is carried out such that only the user can use radio resources in the specific allocated time interval. In a CDMA (Code Division Multiplexing Access) system, the scheduling is also carried out so as to allocate a difference code for each user. In other words, one code is allocated to only one user. In the OFDM/OFDMA system, a certain user can use an allocated region that comprises a two dimensional map represented by time and frequency.

FIG. 2 illustrates a data frame configuration according to a conventional OFDM/OFDMA radio communications system. Referring to FIG. 2, a horizontal axis indicates time by a symbol unit, while the vertical axis indicates frequency by a subchannel unit. The subchannel refers to a bundle of a plurality of sub-carriers.

An OFDMA physical layer divides active sub-carriers into groups, and the active sub-carriers are transmitted to different receiving ends respectively by the group. Thus, the group of sub-carriers transmitted to one receiving end is referred to as the subchannel. The sub-carriers configuring each subchannel may be adjacent to one another or an equal interval away from one another.

In FIG. 2, slots allocated to each user are defined by a data region of a two dimensional space and refers to a set of successive subchannels allocated by a burst. One data region in the OFDMA is indicated as a rectangular shape which is determined by time coordinates and subchannel coordinates. This data region may be allocated to an uplink of a specific user or a base station can transmit the data region to a specific user over a downlink.

A downlink sub-frame is initiated by a preamble used for synchronization and equalization in a physical layer, and subsequently defines an overall frame structure by a downlink MAP (DL-MAP) message and an uplink MAP (UL-MAP) message both using a broadcasting type which define position and usage of a burst allocated to the downlink and the uplink.

The DL-MAP message defines a usage of a burst allocated with respect to a downlink interval in a burst mode physical layer. The UL-MAP message defines a usage of a burst allocated with respect to an uplink interval therein. An information element (IE) configuring the DL-MAP includes a DIUC (Downlink Interval Usage Code), a CID (Connection ID) and information of a burst location (for example, subchannel offset, symbol offset, the number of subchannels and the number of symbols). A downlink traffic interval of a user side is divided by the IE.

Alternatively, a usage of an IE configuring the UL-MAP message is defined by a UIUC (Uplink Interval Usage Code) for each CID, and a location of each interval is defined by a 'duration'. Here, a usage by an interval is defined according to the UIUC value used in the UL-MAP, and each interval begins at a point as far as the 'duration' defined in the UL-MAP IE from a previous IE beginning point.

DCD (Downlink Channel Descriptor) message and UCD (Uplink Channel Descriptor) message refer to physical layer related parameters to be applied to each burst interval allocated to the downlink and the uplink, which include a modulation type, a FEC code type, and the like. In addition, Parameters required (e.g., K and R values of R-S code) are defined according to various downlink error correction code types. Such parameters are provided by a burst profile defined for each UIUC and DIUC within the UCD and the DCD.

On the other hand, a MIMO (Multi-input Multi-output) technique in the OFDM/OFDMA system is classified into a diversity method and a multiplexing method. The diversity method is a technique in which signals having undergone different rayleigh fading are coupled to one another by a plurality of transmitting/receiving antennas to compensate a channel deep between paths, thereby leading to an improvement of reception performance. A diversity benefit to be obtained by this technique is divided into a transmission diversity and a reception diversity depending on whether it is a transmitting end or a receiving end. When N-numbered transmitting antennas and M-numbered receiving antennas are provided, a maximum diversity benefits corresponds to MN by coupling MN-numbered individual fading channels in maximum.

The multiplexing method increases a transmission speed by making hypothetical subchannels between transmitting and receiving antennas and transmitting respectively different data through each transmitting antenna. Unlike the diversity method, the multiplexing method cannot achieve sufficient benefits when only one of transmitting and receiving ends uses a multi-antenna. In the multiplexing method, the number of individual transmission signals to be simultaneously transmitted indicates the multiplexing benefit, which is the same as a minimum value of the number of transmitting end antennas and the number of receiving end antennas.

There also exists a CSM (Collaborative Spatial Multiplexing) method as one of the multiplexing method. The CSM method allows two terminals to use the same uplink, thereby saving uplink radio resources.

Methods for allocating radio resources of the uplink or downlink in the OFDM/OFDMA system, namely, allocating data bursts are divided into a typical MAP method and an HARQ method according to whether the HARQ method is supported or not.

In the method for allocating the bursts in the general downlink MAP, there is shown a square composed of a time axis and a frequency axis. In this method, an initiation symbol offset, an initiation subchannel offset, the number of symbols used and the number of subchannels used are informed. A method for allocating the bursts in sequence to a symbol axis is used in the uplink, and accordingly, if the number of symbols used is informed, the uplink bursts can be allocated.

The HARQ MAP, unlike the general MAP, uses a method for allocating the uplink and the downlink in sequence to a subcarrier axis. In the HARQ MAP, only the length of burst is informed. By this method, the bursts are allocated in sequence. An initiation position of the burst refers to a position where the previous burst ends, and the burst takes up radio resources as much as the length allocated from the initiation position.

The OFDM/OFDMA system supports the HARQ using the HARQ MAP. In the HARQ MAP, a position of the HARQ MAP is informed by an HARQ MAP pointer IE included in the DL-MAP. Accordingly, the bursts are allocated in sequence to the subchannel axis of the downlink. The initiation position of the burst refers to the position where the previous burst ends and the burst takes up radio resources as much as the length allocated from the initiation position. This is also applied to the uplink.

FIG. 3 illustrates an uplink radio resource (data burst) that is allocated to a terminal using a typical DL-MAP according to a conventional art.

In case of a typical DL-MAP, a first burst subsequent to a position of the UL-MAP is allocated to the terminal. The UL-MAP allocates an uplink data burst by the UL-MAP IE.

In the CSM method of the OFDMA technique based on IEEE802.16d and e, a base station in the typical DL-MAP method informs each terminal of data burst positions by a MIMO UL basic IE with the data format as shown in Table 1, and allocates the same radio resource to each terminal.

In order to notice the use of the MIMO UL basic IE, UIUC=15 is used as an extended UIUC. There are 16 different values to be represented as the extended UIUC.

TABLE 1

| Syntax | Size (bits) | Notes |
| --- | --- | --- |
| MIMO_UL_Basic_IE( ){ | | |
|   Extended DIUC | 4 | MIMO = 0x02 |
|   Length | 4 | Length of the message in bytes(variable) |
|   Num_Assign | 4 | Number of burst assignment |
|   For(j=0; j<Num_assign;j++){ | | |
|     CID | 16 | SS basic CID |
|     UIUC | 4 | |
|     MIMO_Control | 1 | For dual transmission capable MSS<br>  0: STTD<br>  1: SM<br>For Collaborative SM capable MSS<br>  0: pilot pattern A<br>  1: pilot pattern B |
|     Duration | 10 | In OFDMA slots |
|   } | | |
| } | | |

The MIMO UL basic IE which is used for allocating the same uplink resource to two terminals is used for other conventional MIMOs. When a terminal has more than two antennas, the MIMO UL basic IE informs the terminals which method, namely, a STTD method for obtaining a diversity benefit or an SM method for increasing transmission speed, is used.

The CSM method in the OFDMA technique based on IEEE 802.16d, e can be embodied by the HARQ MAP for an HARQ embodiment. FIG. 4 illustrates an uplink radio resource (data burst) that is allocated to a terminal by using the HARQ-MAP according to a conventional art.

Unlike the method for informing every bursts by the DL-MAP, in the method as shown in FIG. 4, an HARQ existence is informed by an HARQ MAP pointer IE of the DL-MAP IE for an HARQ exclusive. The HARQ MAP pointer IE informs of a modulation of the HARQ MAP, and coding state and size of the HARQ MAP.

The HARQ MAP is composed of a compact DL-MAP/UL-MAP informing of position and size of the HARQ burst, and, in particular, uses a MIMO compact UL IE for the MIMO. The MIMO compact UL IE is used by being attached to a position subsequent to a 'compact UL-MAP IE for normal subchannel' for allocating the conventional subchannel and a 'compact UL-MAP IE for band AMC' for allocating the band AMC. As shown in FIG. 4, the MIMO compact UL IE has only a function of a previously allocated subchannel.

In the aforementioned conventional art, when additional radio resource is required by the increased demand of the uplink, there is no appropriate way to satisfy such requirement. In that case, adding a frequency resource may be considered. However, because a base station position must be considered and it affects on the entire system, it is not regarded as a preferred alternative for increasing uplink resources. More preferred method is to allow more than two user to simultaneously use the existing resources that are previously allocated to one user.

SUMMARY OF THE INVENTION

Therefore, an object of the present invention is to provide a method for allocating a radio resource in an OFDM/OFDMA system in which many users can simultaneously take up and use a radio resource allocated from an uplink.

To achieve these and other advantages and in accordance with the purpose of the present invention, as embodied and broadly described herein, there is provided a radio resource allocation system in an orthogonal frequency multiplexing access system, in which the same uplink radio resource is allocated to more than two terminals.

According to one embodiment of the invention, a method of allocating a radio resource in a wireless communication system utilizing orthogonal frequency division multiplexing comprises receiving data associated with a radio resource allocation map from a base station. The radio allocation map comprises control parameters for transmitting uplink data to the base station. The control parameters comprises orthogonal pilot pattern indicator for using orthogonal pilot patterns associated with supporting at least concurrent dual transmission by at least one mobile station, and for use in the same frequency band and same time duration. The orthogonal pilot patterns comprising at least a minus pilot being used for an uplink basic allocation unit. The mobile station then transmits uplink data to the base station by using the orthogonal pilot patterns. Preferably, the at least concurrent dual transmission is achieved by using at least two antennas in the mobile station.

According to one aspect of the invention, each one of the orthogonal pilot patterns comprises a plus pilot and the minus pilot located at each diagonal corner of the uplink basic allocation unit. Preferably, the plus pilot and the minus pilot have opposite phases.

According to another aspect of the invention, information associated with the orthogonal pilot patterns is communicated to the mobile station using a map information element or a HARQ map information element.

According to another aspect of the invention, the uplink data comprises at least two sets of data spatially multiplexed onto the same subchannel by using the orthogonal pilot patterns.

According to another embodiment of the invention, a method of allocating a radio resource in an orthogonal frequency division multiplexing system comprises transmitting, to a mobile station, data associated with a radio resource allocation map, wherein the radio allocation map comprises control parameters for transmitting uplink data to the base station, wherein the control parameters comprises orthogonal pilot pattern indicator for using orthogonal pilot patterns associated with supporting at least concurrent dual transmission by at least one mobile station, and for use in the same frequency band and same time duration, the orthogonal pilot patterns comprising at least a minus pilot being used for an uplink basic allocation unit; and receiving uplink data from the mobile station, wherein the uplink data is coded using the orthogonal pilot patterns. Preferably, the concurrent dual transmission is achieved by using at least two antennas in the mobile station, and the uplink data comprises at least two sets of data spatially multiplexed onto the same subchannel by using the orthogonal pilot patterns.

According to one aspect of the invention, each one of the orthogonal pilot patterns comprises a plus pilot and the minus pilot located at each diagonal corner of the uplink basic allocation unit. Preferably, the plus pilot and the minus pilot have opposite phases.

According to another aspect of the invention, information associated with the orthogonal pilot patterns is communicated to the mobile station using a map information element or a HARQ map information element.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 illustrates a basic allocation unit for an uplink radio resource which is transmitted through an uplink in an OFDM/OFDMA system.

FIG. 11 illustrates an operation based on the CSM method using the HARQ-MAP in accordance with another embodiment of the present invention.

DETAILED DESCRIPTION OF THE PREFERRED EMBODIMENTS

Reference will now be made in detail to the preferred embodiments of the present invention, examples of which are illustrated in the accompanying drawings. Hereinafter, preferred embodiments of the present invention will be explained with reference to the accompanying drawings as follows.

The present invention is a technology for enlarging uplink capacity, which allows many mobile terminals to simultaneously use a radio resource allocated to one mobile terminal. A mobile terminal requires a variation of a pilot or a reference signal for measuring radio channels, while a base station requires a method for decoding data (or signals) of a plurality of mobile terminals transmitted using one radio resource and a method for controlling power to reduce an affect of a signal interference due to an increase of users.

Figure 5:
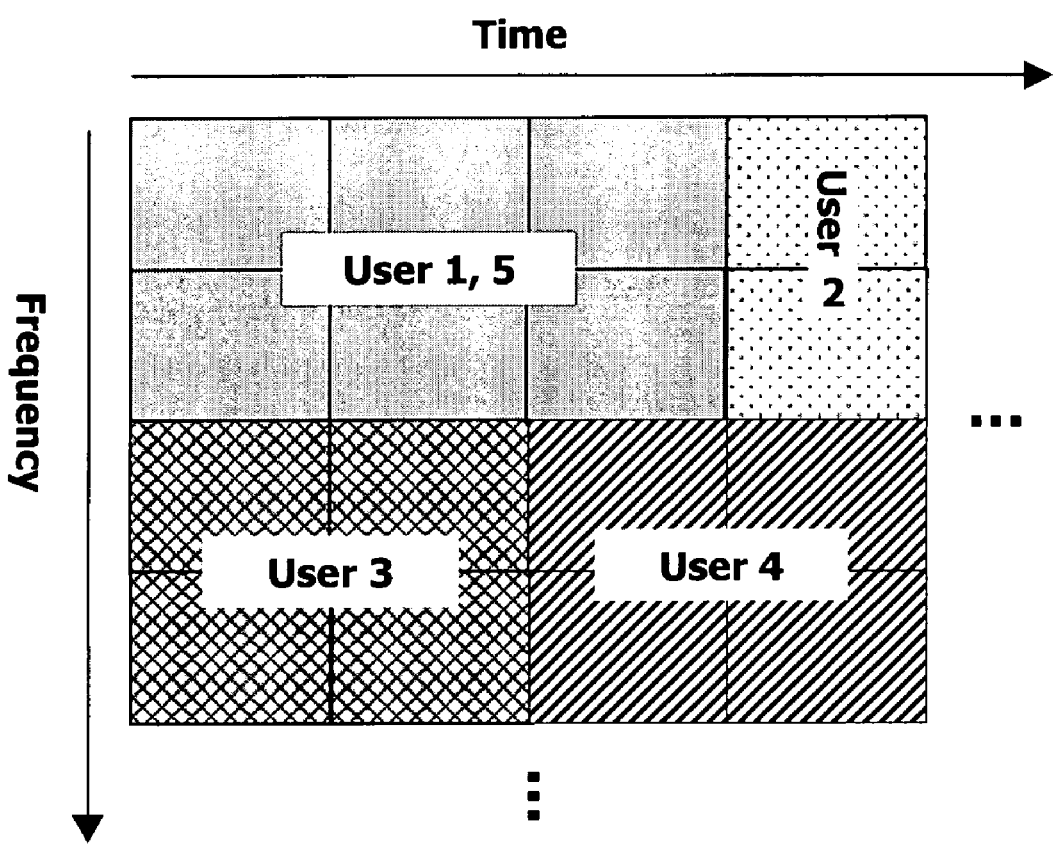
FIG. 5 illustrates an allocation of an uplink radio resource in an OFDM/OFDMA system according to a first embodiment of the present invention.

FIG. 5 illustrates an uplink radio resource allocation in an OFDM/OFDMA system, according to one embodiment of the present invention, in which it is assumed that the same radio resource is allocated to user 1 and user 5 for reference. The term "user" represents a mobile terminal.

A base station first informs the two users (user 1 and user 5) by a signaling or a message that the same radio resource is allocated thereto, and information related to types of channel coding to be used, coding rate, modulation method, pilot pattern, code system for space and time, and other parameters.

A signal transmission/reception between mobile terminals and a base station of the two users (for example, user 1 and user 5) has four different transmission/reception combinations, respectively, according to the code system for space and time, the number of receiving antennas of the base station, and the number of transmitting antennas of the mobile terminals, which will be explained as follows.

First, under a spatial multiplexing transmission method, when the mobile terminals of the two users (user 1 and user 5), respectively, have one transmitting antenna and the base station has more than two receiving antennas, the transmission/reception combination is defined in [Equation 1] as follows.

$$\begin{bmatrix} x_1 \\ x_2 \\ \vdots \\ x_N \end{bmatrix} = \begin{bmatrix} h_{11} & h_{12} \\ h_{21} & h_{22} \\ \vdots & \vdots \\ h_{N1} & h_{N2} \end{bmatrix} \begin{bmatrix} s_1 \\ s_2 \end{bmatrix} + v \qquad \text{[Equation 1]}$$

In [Equation 1], $x_i$ is a signal transmitted to an $i^{th}$ antenna, $h_{ji}$ is a channel which is delivered from an $i^{th}$ mobile terminal to a $j^{th}$ antenna of the base station, $s_i$ is data of the $i^{th}$ mobile terminal, and v is an additive White Gaussian Noise Vector (AWGN Vector).

Second, under the spatial multiplexing transmission method, when the mobile terminals of the two users (user 1 and user 5) respectively have one transmitting antenna and the base station has one receiving antenna, the transmission/reception combination is defined in [Equation 2] as follows.

$$x = h_1 s_1 + h_2 s_2 + v \qquad \text{[Equation 2]}$$

In [Equation 2], x is a signal transmitted to the base station, $h_i$ is a channel delivered from an $i^{th}$ mobile terminal to the base station, $s_i$ is data of the $i^{th}$ mobile terminal, and v is an additive White Gaussian Noise Vector (AWGN Vector).

Third, under a space time transmit diversity transmission method, when the mobile terminals of the two users (user 1 and user 5) respectively have two transmitting antennas and the base station has more than two receiving antennas, the transmission/reception combination is defined in [Equation 3] as follows.

$$\begin{bmatrix} x_1(k) \\ x_1^*(k+1) \\ x_2(k) \\ x_2^*(k+1) \end{bmatrix} = \begin{bmatrix} h_{1,11} & h_{1,12} & h_{2,11} & h_{2,12} \\ h_{1,12}^* & -h_{1,11}^* & h_{2,12}^* & -h_{2,11}^* \\ h_{1,21} & h_{1,22} & h_{2,21} & h_{2,22} \\ h_{1,22}^* & -h_{1,21}^* & h_{2,22}^* & -h_{2,21}^* \end{bmatrix} \begin{bmatrix} s_{1,1} \\ s_{1,2} \\ s_{2,1} \\ s_{2,2} \end{bmatrix} + v \qquad \text{[Equation 3]}$$

In [Equation 3], $x_i$ is a signal transmitted to an $i^{th}$ antenna of the base station, $h_{i,j,k}$ is a channel delivered from a $k^{th}$ antenna of an $i^{th}$ mobile terminal to a $j^{th}$ antenna of the base station, $s_{i,j}$ is a $j^{th}$ data of the $i^{th}$ mobile terminal, and v is an additive White Gaussian Noise Vector (AWGN Vector).

Fourth, under the spatial multiplexing transmission method, when the mobile terminals of the two users (user 1 and user 5) respectively have a plurality of transmitting antennas and the base station has more than four receiving antennas, the transmission/reception combination is defined in [Equation 4] as follows.

$$\begin{bmatrix} x_1 \\ x_2 \\ x_3 \\ x_4 \end{bmatrix} = \begin{bmatrix} h_{1,11} & h_{1,12} & h_{2,11} & h_{2,12} \\ h_{1,21} & h_{1,22} & h_{2,21} & h_{2,22} \\ h_{1,31} & h_{1,32} & h_{2,31} & h_{2,32} \\ h_{1,41} & h_{1,42} & h_{2,41} & h_{2,42} \end{bmatrix} \begin{bmatrix} s_{1,1} \\ s_{1,2} \\ s_{2,1} \\ s_{2,2} \end{bmatrix} + v \qquad \text{[Equation 4]}$$

In [Equation 4], $x_i$ is a signal transmitted to an $i^{th}$ antenna of the base station, $h_{i,j,k}$ is a channel delivered from a $k^{th}$ antenna of an $i^{th}$ mobile terminal to a $j^{th}$ antenna of the base station, $s_{i,j}$ is a $j^{th}$ data of the $i^{th}$ mobile terminal, and v is an additive White Gaussian Noise Vector (AWGN Vector).

The base station transmits predetermined information (i.e., types of channel coding, coding rate, modulation method, pilot pattern, code system for space and time, etc) to the two users (user 1 and user 5), and determines priorities of the two users (user 1 and user 5). (here, it is assumed that the user 1 is a first user and the user 5 is a fifth user)

Once determining each priority, the two users transmit respective data to the base station by including the data in sub-carriers for data of a basic allocation unit. The basic allocation unit is illustrated in FIG. 6.

FIG. 6 illustrates a basic allocation unit (also known as a tile) of a radio resource transmitted through an uplink in an OFDM/OFDMA system. A multiple of the basic allocation unit becomes a minimum allocation unit capable of being allocated to one user. Six times of the basic allocation unit, as an example according to the conventional art, is the minimum allocation unit.

A frequency axis of the basic allocation unit can depend on an order of sub-carriers, and be an axis configured by a group unit by making a plurality of subcarriers which are extended (or adjacent) thereto a group. The axis can be arbitrarily configured.

Figure 8:
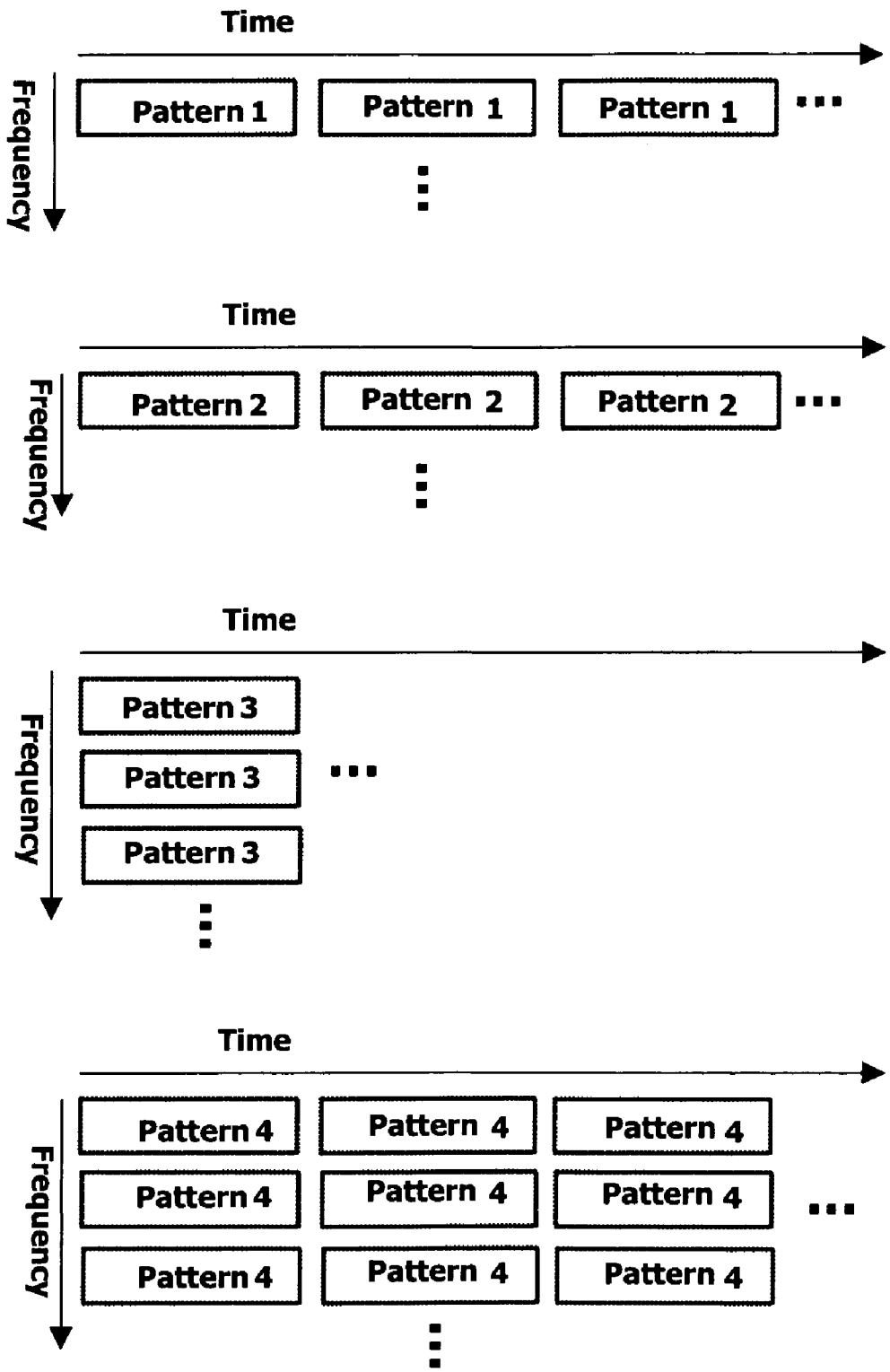
FIG. 8 illustrates a combination of pilot patterns configuring an uplink data burst according to one embodiment of the present invention.

The basic allocation unit transmitted through an uplink in the OFDM/OFDMA system may have a different structure from that shown in FIG. 6 and may have a different arrangement of the pilots and data in accordance to the system characteristics. When using a different basic allocation unit from that shown in FIG. 6, pilot patterns suitable therefor may be combined as shown in FIG. 8.

The base station analyzes a pilot pattern of the basic allocation unit received over the uplink to identify which user (i.e., mobile terminal) has transmitted the received data. In other words, the base station identifies whether the received data is from user 1 or user 5 by analyzing the pilot pattern included in the basic allocation unit.

Figure 7A:
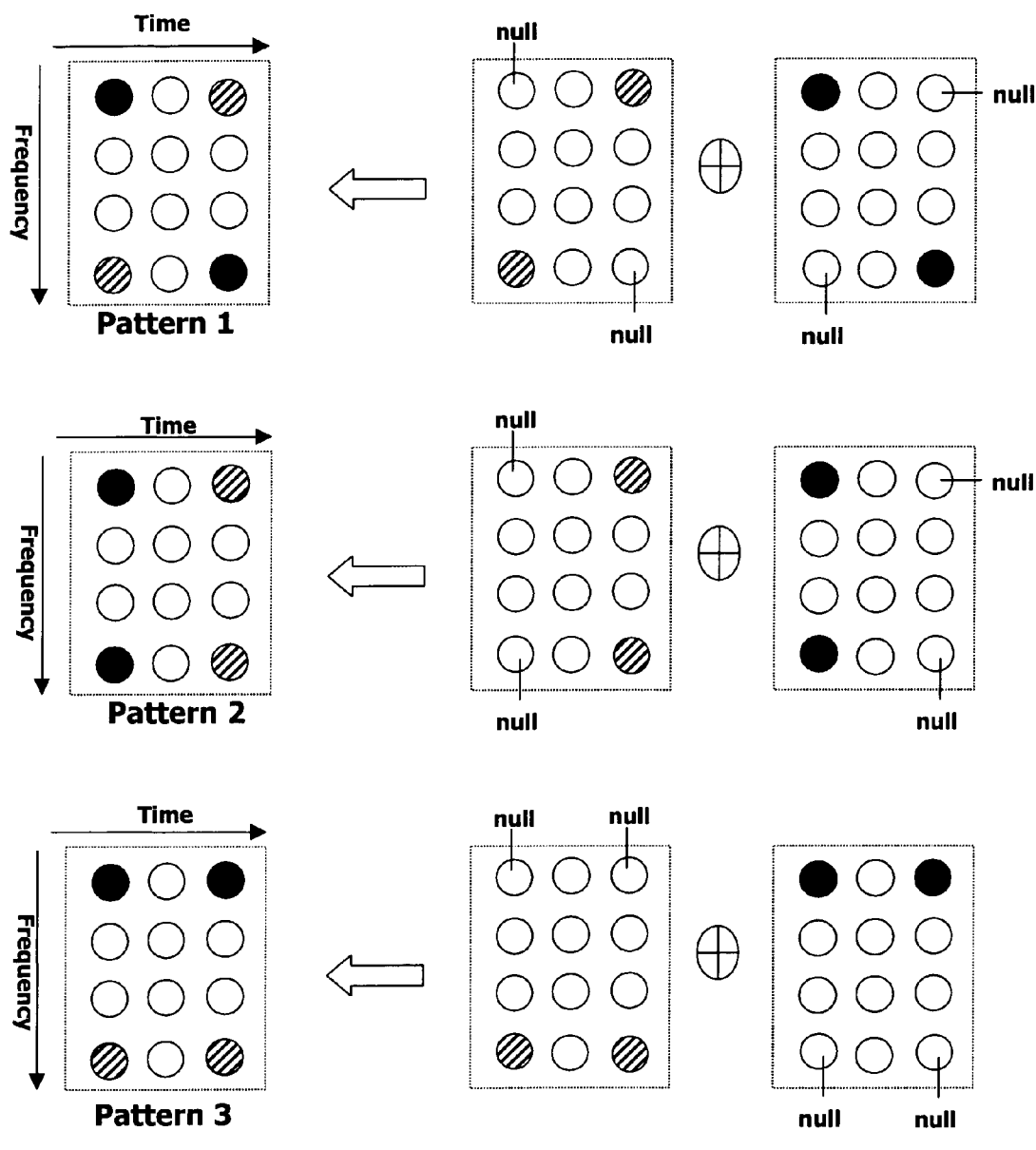
FIG. 7A illustrates pilot patterns for multi-users according to the first embodiment of the present invention.
Figure 7B:
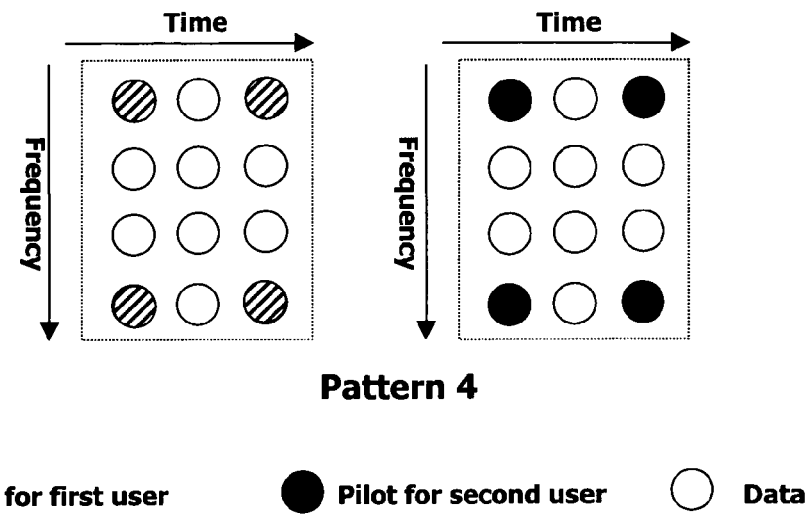
FIG. 7B illustrates pilot patterns using different orthogonal codes according to another embodiment of the present invention.
Figure 7C:
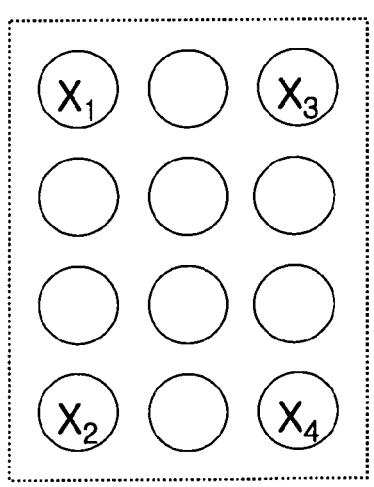
FIG. 7C is a signal value table allocated to each pilot shown in FIGS. 7A and 7B.

FIGS. 7A and 7B illustrate pilot patterns according to the first embodiment of the present invention, and FIG. 7C is a table showing a signal value allocated to each pilot shown in FIGS. 7A and 7B.

In patterns 1, 2, and 3 as shown in FIG. 7A, user 1 and user 5 use different pilots, respectively, and thus, the data of the two users can be identified. On the other hand, in pattern 4 as shown in FIG. 7B, user 1 and user 5 use the same pilot subcarrier or subchannel, but the data of the two users can be identified by using orthogonal codes.

For re-explaining these in aspect of a division method, pattern 1 is pilots according to a time division and a frequency division, pattern 2 is pilots according to the frequency division, pattern 3 is pilots according to the time division, and pattern 4 is pilots according to a code division.

The pilot patterns in FIGS. 7A and 7B show embodiments of the present invention, and may be changed according to the basic allocation unit. Furthermore, when the radio resource of the two users (user 1 and user 5) is composed of a plurality of basic allocation units, as shown in FIG. 8, the patterns in FIGS. 7A to 7C can be combined.

Referring to FIG. 7C, the pilot patterns C and D according to one embodiment of the present invention are illustrated. Because of the orthogonality, the pilot patterns C and D are used for mobile stations capable of dual transmission, as noted in Table 4 below. The pilot signal value of +1 represents a positive amplitude pilot, whereas the pilot signal value of −1 represents a negative amplitude pilot. In other words, +1 and −1 represents the pilots that are phase shifted by 180 degrees.

Since pilots are used for compensating distortion due to a radio channel, they should have a structure in which the pilots for user 1 and the pilots for user 5 are alternate. The base station uses a pilot signal for measuring the radio channel for each user and compensating the channel, and applies it to a method for dividing data of users. In addition, data for each user can be divided and detected by applying a radio channel of each user and the number of users for the simultaneous allocation, which has already been known, to an equation for a detection method such as a maximum likelihood herebelow.

$$x = h_1 s_1 + h_2 s_2 + v \quad \text{[Equation 5]}$$
$$(\hat{s}_1, \hat{s}_2) = \underset{(s_1, s_2)}{\mathrm{argmax}} |x - \hat{h}_1 s_1 - \hat{h}_2 s_2|$$

Under the spatial multiplexing transmission method, [Equation 5] represents the maximum likelihood when the mobile terminals of the two users (user 1 and user 5) respectively have one transmitting antenna, and the base station has one receiving antenna.

In [Equation 5], $\hat{h}_1, \hat{h}_2$ are estimation values of radio channel coefficients $h_1, h_2$ obtained using pilots. The $\hat{h}_1, \hat{h}_2$ can be re-estimated by using $s_1, s_2$, and the $\hat{s}_1, \hat{s}_2$ can be updated by using the re-estimated $\hat{h}_1, \hat{h}_2$. $s_1, s_2$ in [Equation 5] can have zero and a value of a modulation value, which has already been known. For instance, when the modulation method is a QPSK method, a set for values which the $s_1, s_2$ may have {1+i, 1−i, −1+i, −1−i, 0}.

The base station controls power of the two users through a downlink such that signals of the two users (user 1 and user 2) can have appropriate power. In some cases, the base station can control a whole power of the two users to be uniform and also control each signal power of the two users. Explaining it in more detail, the base station controls power P1+P5 obtained by adding the power P1 of the user 1 and the power P5 of the user 5 to be maintained as same as power P2, P3 or P4 of other users (user 2, user 3 or user 4), or controls the sum of power P1+P5 of the two users such that the sum of power P1+P5 can be maintained to be stronger or weaker than the power P3, P3 or P4 of other users.

On the other hand, in order to detect data of the two users more precisely, the base station may adjust a power ratio (P1:P5) between the two users. That is, a weight value is included in the power of one of the two users, so as to adjust the power ratio (P1:P5) between the two users.

For instance, when the power ratio between the two users using the QPSK method is 1:4, signals added have different values, respectively, as shown in [Table 2] herebelow, and accordingly the detection is more easily performed.

TABLE 2

| User1 | User2 | | | |
|---|---|---|---|---|
| | 2 + 2i | 2 − 2i | −2 + 2i | −2 − 2i |
| 1 + i | 3 + 3i | 3 − i | −1 + 3i | −1 − i |
| 1 − i | 3 + i | 3 − 3i | −1 + i | −1 − 3i |
| −1 + i | 1 + 3i | 1 − i | −3 + 3i | −3 − i |
| −1 − i | 1 + i | 1 − 3i | −3 + i | −3 − 3i |

Figure 1:
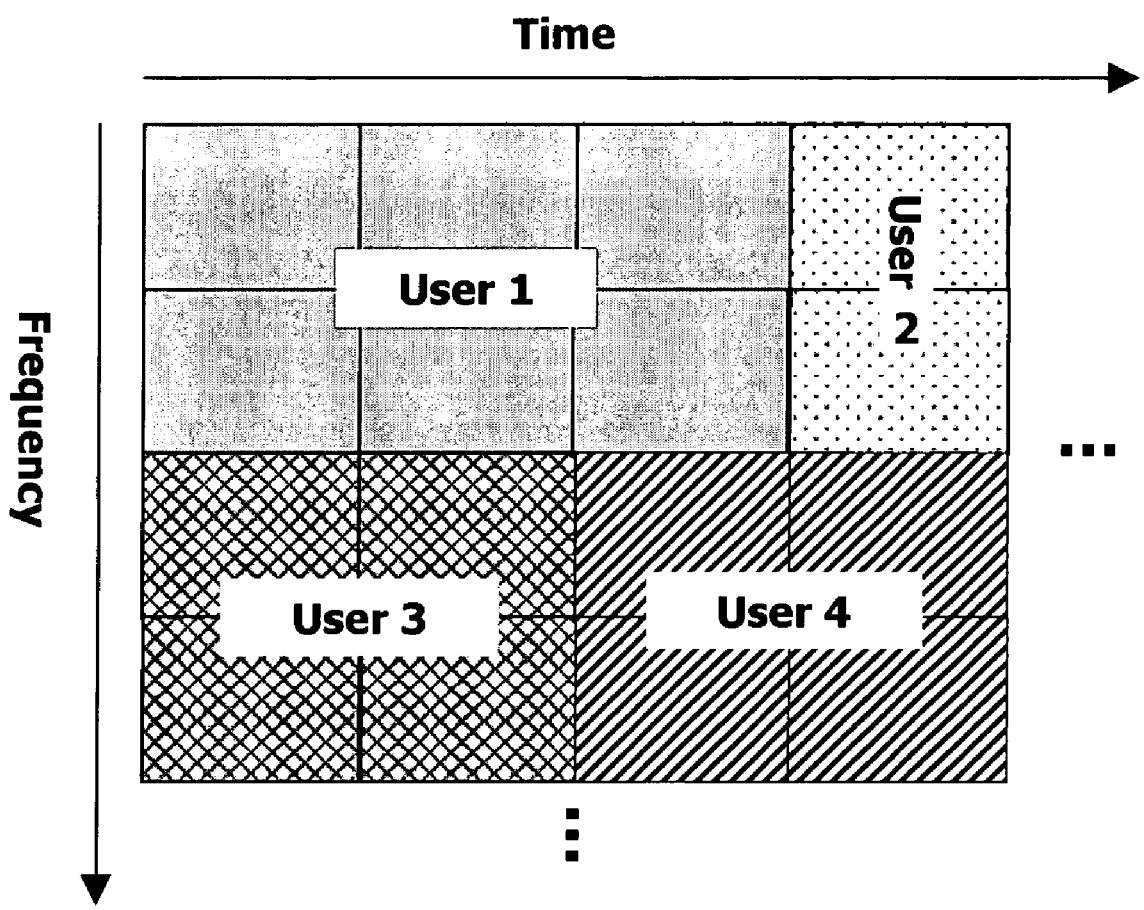
FIG. 1 illustrates an allocation of a radio resource according to a conventional art.
Figure 2:
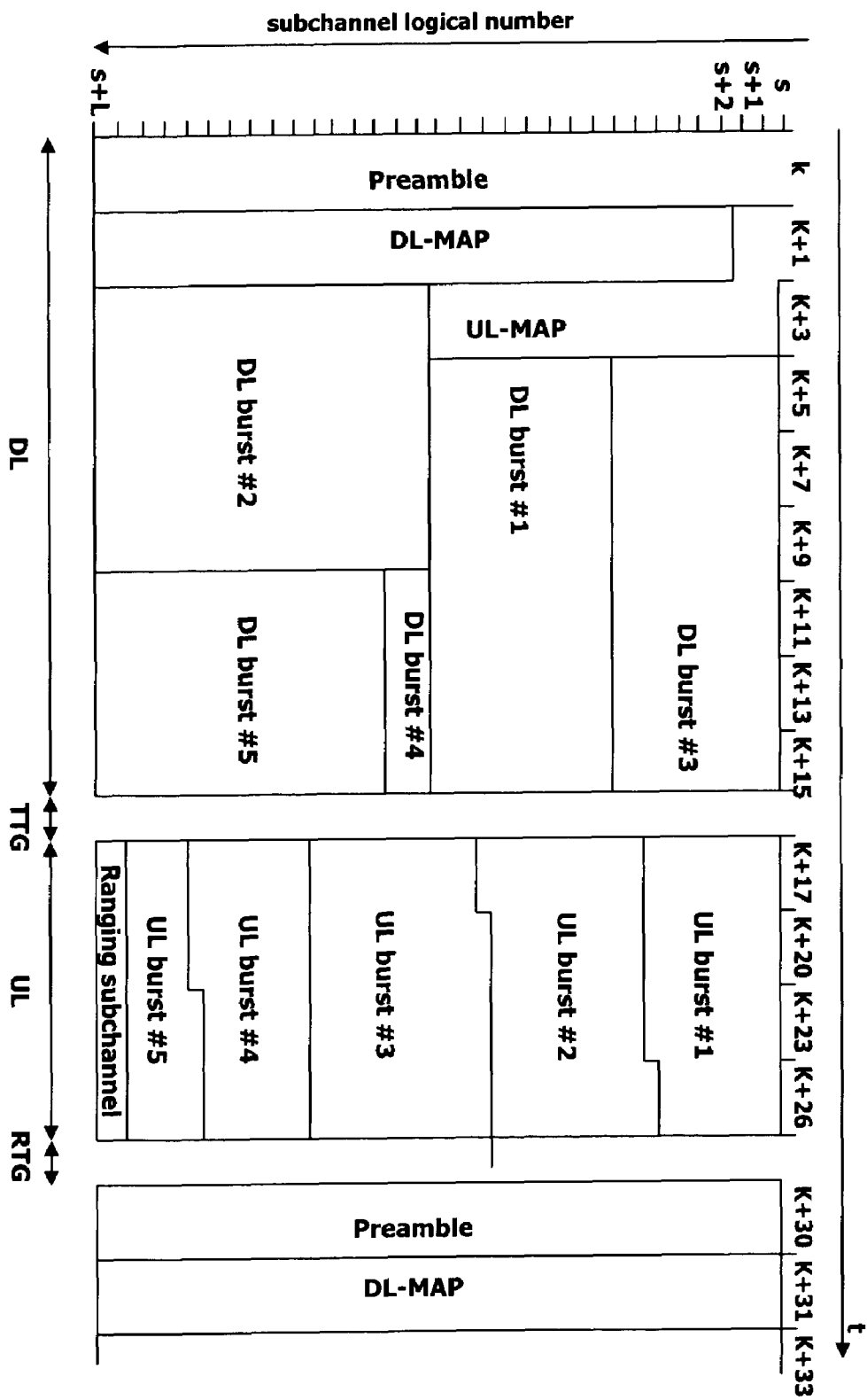
FIG. 2 illustrates a data frame configuration in a conventional OFDMA radio communications system.
Figure 3:
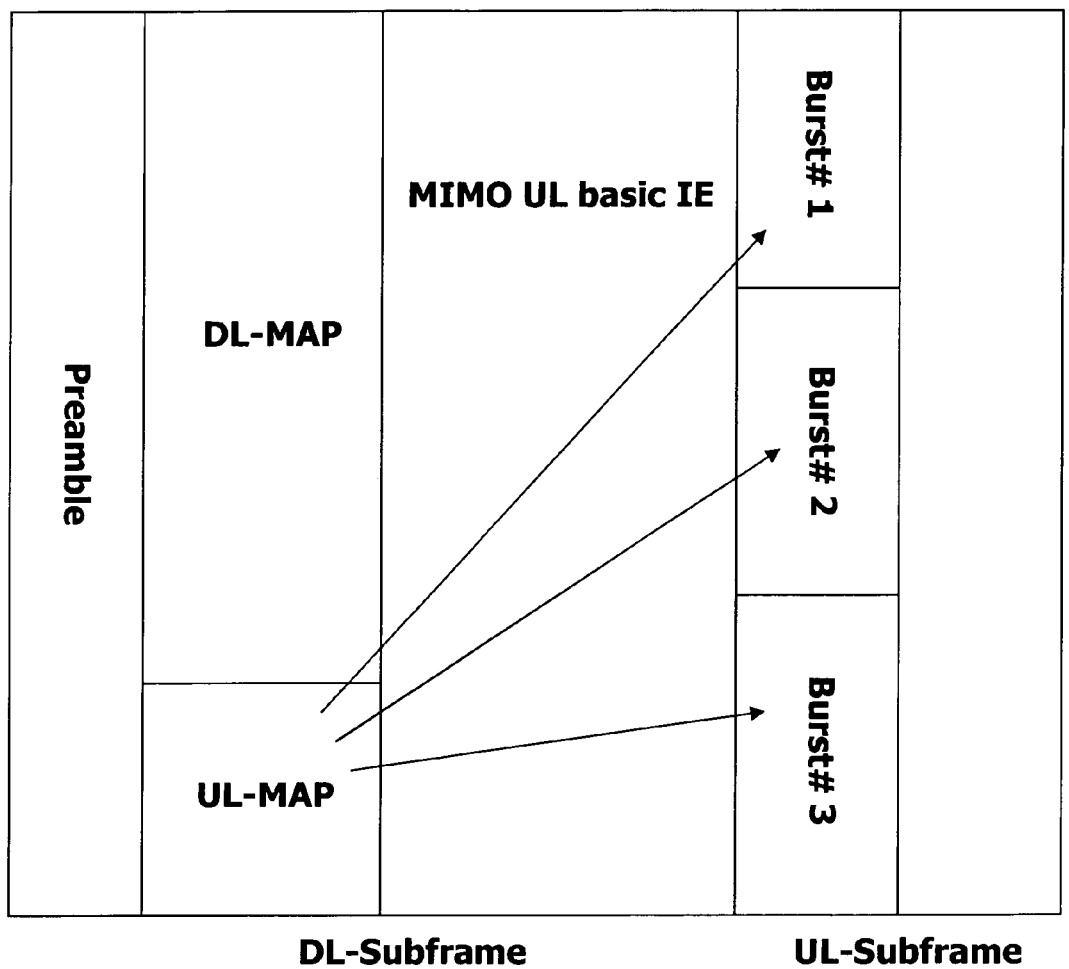
FIG. 3 illustrates an operation of allocating an uplink radio resource to a terminal by using a typical DL-MAP according to conventional art.
Figure 4:
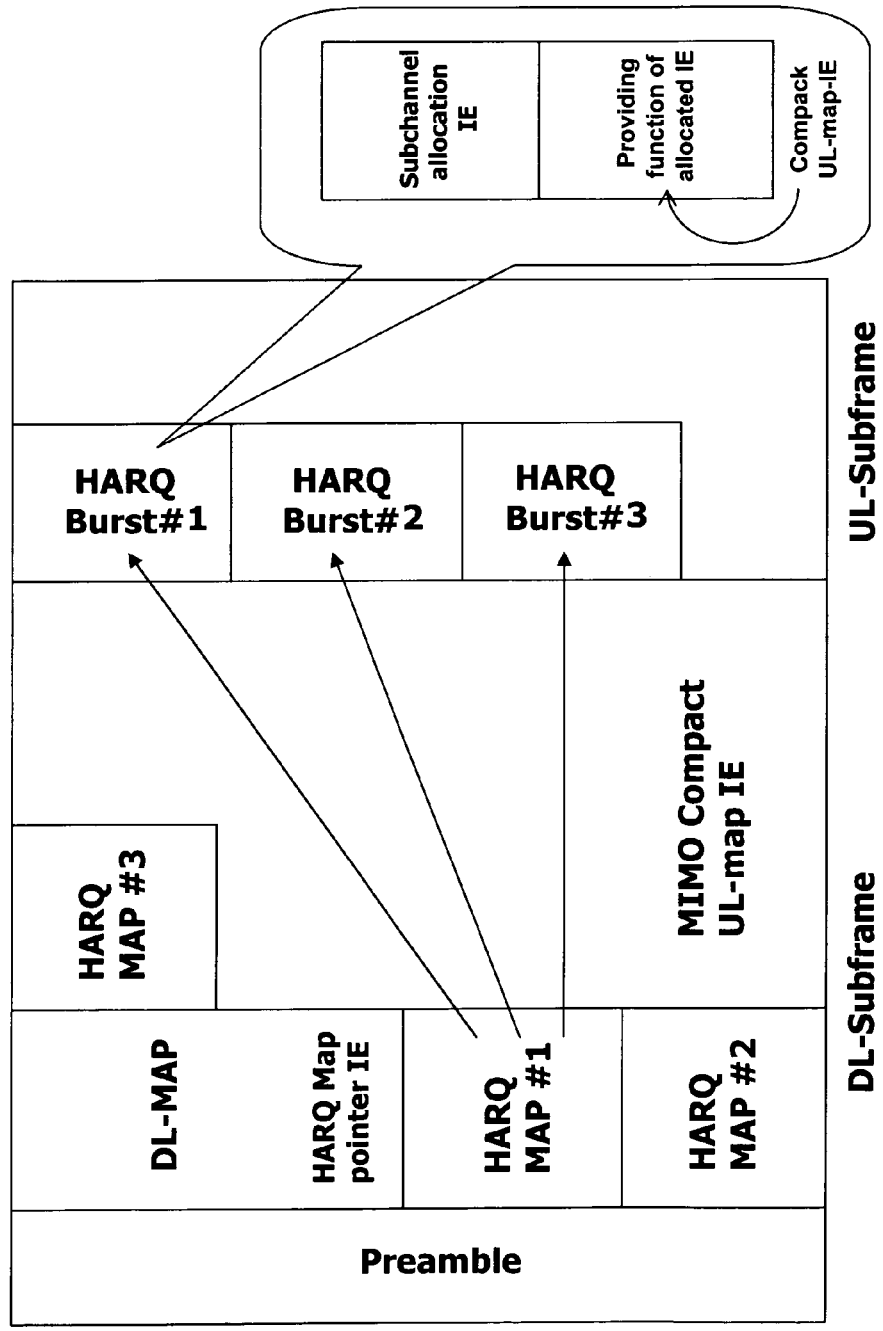
FIG. 4 illustrates an operation of allocating an uplink radio resource to a terminal by using an HARQ-MAP according to conventional art.

A user that cannot send data delivers a null value or a dummy code to the base station. For instance, in the structure shown in FIG. 3, the user sends 1+i by including it in eight sub-carriers for data.

Hereinafter, another embodiment of the present invention will be explained.

When a terminal uses the CSM (Collaborative Spatial Multiplexing) method, the same uplink radio resource is allocated to two mobile terminals and different pilot patterns are used, respectively, for identifying signals delivered from two mobile terminals. Applying the CSM method to the two terminals having two antennas is possible by the typical DL-MAP and the HARQ MAP.

Figure 9:
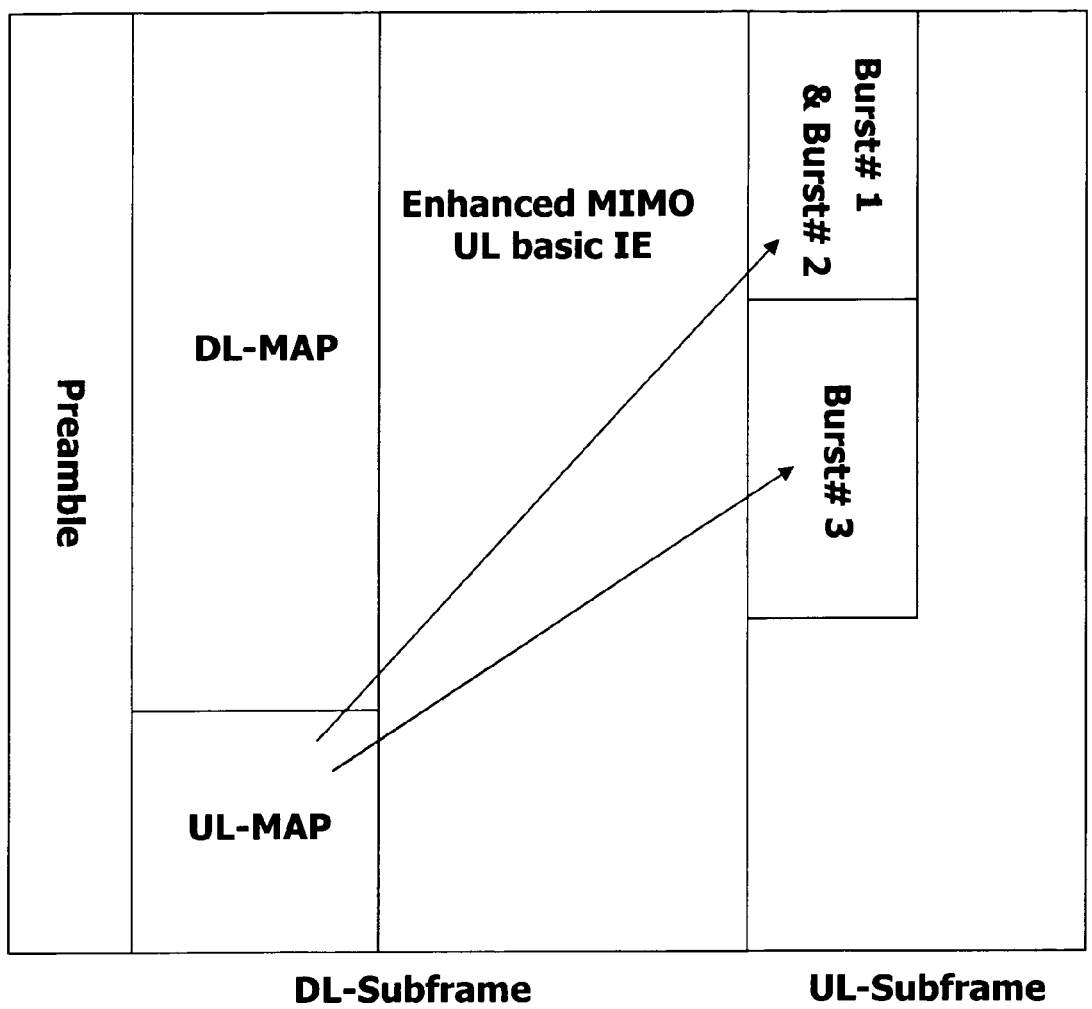
FIG. 9 illustrates an operation based on a CSM method using a typical DL-MAP in accordance with one embodiment of the present invention.

FIG. 9 illustrates an operation of the CSM method using the typical DL-MAP according to an embodiment of the present invention.

In the typical UL-MAP, the UL-MAP allocates a first data burst subsequent thereto to a terminal. The UL-MAP, as shown in FIG. 8, allocates the data burst by the UL-MAP IE.

In the CSM method, a position of the burst allocated to two mobile terminals is informed by a MIMO UL enhanced IE with a format as shown in Table 3, or the conventional MIMO UL basic IE.

Hereinafter, an embodiment of the CSM method by the MIMO UL enhanced IE, a new IE, will be explained. When every IEs to be represented as the UIUC is included, as shown in Table 3, a new extended UIUC can be fabricated as 11 slots in order to add a new IE.

TABLE 3

| UIUC | Usage |
|---|---|
| 0 | Fast-Feedback Channel |
| 1-10 | Different burst Profiles |
| 11 | New Extended UIUC |
| 12 | CDMA Bandwidth Request, CDMA ranging |
| 13 | PARP reduction allocation, Safety zone |
| 14 | CDMA Allocation IE |
| 15 | Extended UIUC |

TABLE 4

| Syntax | Size (bits) | Notes |
|---|---|---|
| MIMO_UL_Enhanced_IE( ){ | | |
|   New Extended UIUC | 4 | Enhanced MIMO = 0x01 |
|   Length | 4 | Length of the message in bytes(variable) |
|   Num_Assign | 4 | Number of burst assignment |
|   For(j=0;j<Num_assign;j++){ | | |
|     Num_CID | 2 | |
|     For(i=0;i<Num_CID;i++){ | | |
|       CID | 16 | SS basic CID |
|       UIUC | 4 | |
|       MIMO control | 2 | For dual transmission capable MSS<br>  00: STTD/pilot pattern A, B<br>  01: STTD/pilot pattern C, D<br>  10: SM/pilot pattern A, B<br>  11: SM/pilot pattern C, D<br>For Collaborative SM capable MSS with one antenna.<br>  00: pilot pattern A<br>  01: pilot pattern B<br>  10~11: reserved |
|     } | | |
|     Duration | 10 | In OFDMA slots |
|   } | | |
|   Padding | variable | |
| } | | |

In [Table 4], an uplink resource allocation is determined by a field value referred to as 'duration'. The base station accumulates the number of slots allocated to a time axis, unlike the resource allocation of a square shape used in the downlink, and informs the accumulated value to the terminal. At this time, the number of bursts to be used is informed by an 'Num_assign' field, and CIDs (Connection IDs) of the mobile terminal allocated to each burst are repeatedly informed by the base station.

Characteristics of the bursts allocated to the mobile terminal are preferably determined by a 'MIMO control' field. When the mobile terminal is registered in the base station for applying a CSM (Collaborative Spatial Multiplexing) which is one of MIMO modes, a CSM negotiation between the mobile terminal and base station is performed so as to be known whether the CSM is possible to be applied. Accordingly, the CSM is applied to the mobile terminal for which the CSM is possible.

[Table 5] illustrates a structure of SBC request/response (REQ/RSP) messages exchanged between the base station and the mobile terminal during the CSM negotiation.

TABLE 5

| Type | Length | Value |
|---|---|---|
| Xxx | 1 bit | Bit #0: Collaborative SM<br>Bit #1-#7: reserved |

When each of the two terminals has one antenna, the base station identifies two signals by referring to as A and B for the pilot patterns. When each of the two terminals has two antennas, the base station provides one terminal with pilot patterns A and B, while providing the other terminal with pilot patterns C and D.

As explained above, the "MIMO UL enhanced IE" message can be used by 'extended UIUC=11'. The "MIMO UL enhanced IE" message can be used both when the terminal has only one antenna and when the terminal has two antennas. The IE is characterized by simultaneously allocating two terminals to one uplink burst which is uploaded to the base station. As shown in FIG. 9, the uplink bursts (burst#1 and burst#2) allocated to the two terminals are allocated by using one uplink.

Next, an embodiment of the CSM method by using the "MIMO UL basic IE" message will be explained. [Table 6] illustrates a data format of the "MIMO UL basic IE" message.

TABLE 6

| Syntax | Size (bits) | Notes |
|---|---|---|
| MIMO_UL_basic_IE( ){ | | |
|   Extended UIUC | 4 | MIMO = 0x02 |
|   Length | 4 | Length of the message in bytes(variable) |
|   Num_Assign | 4 | Number of burst assignment |
|   For(j=0;j<Num_assign;j++){ | | |
|     CID | 16 | SS basic CID |

TABLE 6-continued

| Syntax | Size (bits) | Notes |
|---|---|---|
| UIUC | 4 | |
| MIMO control | 2 | For dual transmission capable MSS<br>0: STTD<br>1: SM<br>For Collaborative SM capable MSS<br>0: pilot pattern A<br>1: pilot pattern B |
| Duration | 10 | In OFDMA slots |
| Pilot pattern | 1 | For Collaborative SM dual transmission capable MSS<br>0: pilot pattern A B<br>1: pilot pattern C D |
| } | | |
| Padding | variable | |
| } | | |

The "MIMO UL basic IE" message used for allocating the same uplink resource (data burst) from the base station to the two terminals is also used for other MIMOs. First, when each terminal has more than two antennas, the base station informs the terminals by using the 'MIMO control' field whether to use an STTD method for obtaining a diversity benefit or an SM method for increasing transmission speed. In addition, when each terminal supports the CSM method, the base station allocates the same uplink resource to the two terminals by using the 'MIMO control' field, and instructs the two terminals to use different pilot patterns, respectively, in order to identifying signals transmitted form the two terminals. In order to apply the present invention, when each terminal has two antennas, the conventional 'MIMO control' field informs of the pilot patterns to be used by the two terminals by using one bit reserved for the CSM. There are A~D pilot patterns, which are allocated by two for each terminal.

Next, a CSM method using an HARQ-MAP, as a preferred embodiment of the present invention, will be explained as follows. Unlike the conventional method for allocating a burst to a terminal by the DL-MAP, the HARQ existence is informed by an HARQ MAP pointer IE of the DL-MAP IE. The HARQ MAP pointer IE informs of modulation and coding state of the HARQ MAP and the size thereof.

The HARQ MAP having informed by the HARQ pointer IE is composed of a MIMO compact DL-MAP/UL-MAP which informs of position and size of an HARQ burst. Preferably, a MIMO compact UL IE is used for determining a MIMO mode and a 'MIMO compact UL IE for collaborative SM' is used for the CSM.

Figure 10:
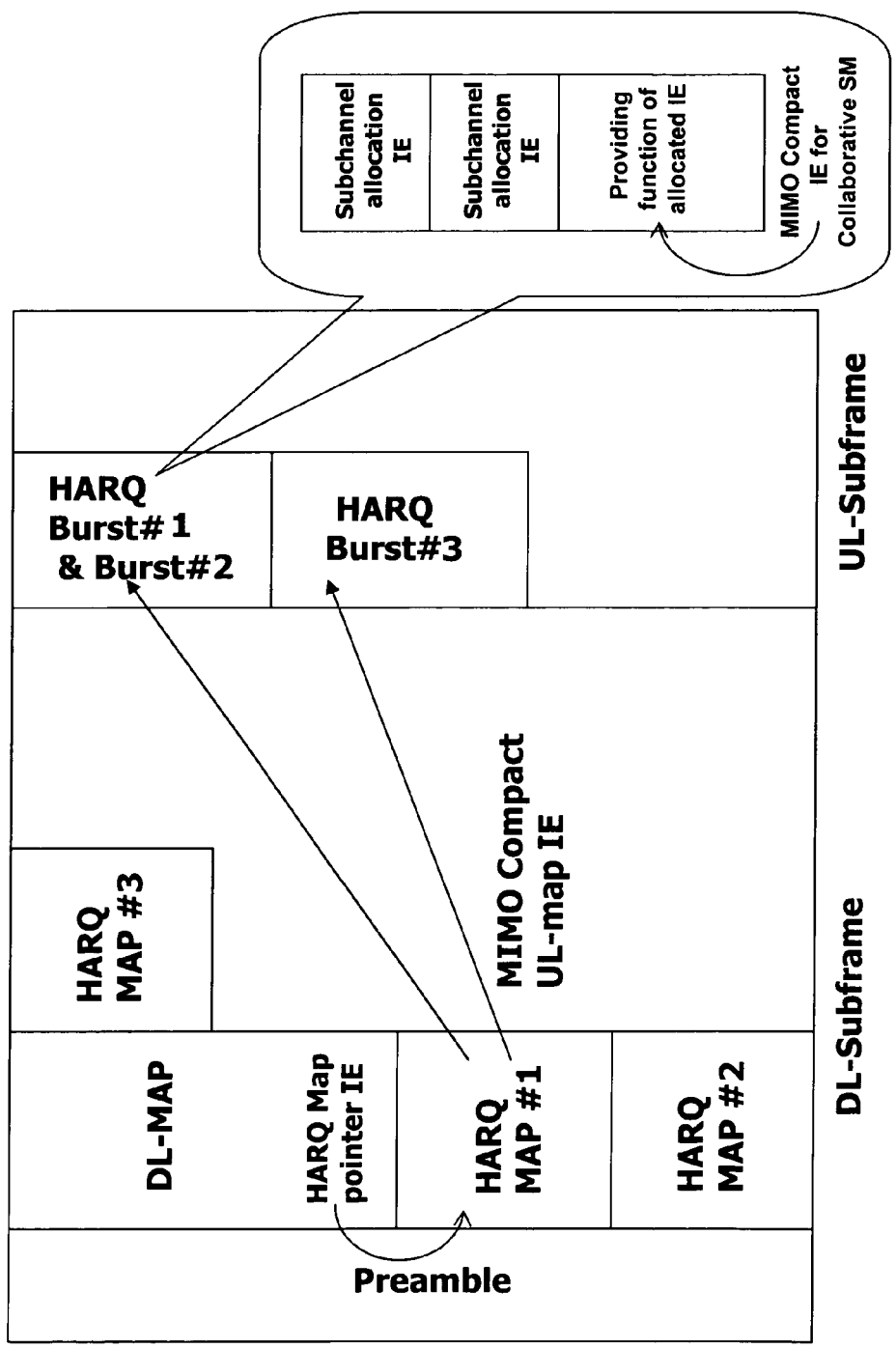
FIG. 10 illustrates an operation based on a CSM method using an HARQ-MAP in accordance with one embodiment of the present invention.

FIG. 10 illustrates an operation of the CSM method using the HARQ-MAP according to an embodiment of the present invention. Table 7 shows a data format of the "MIMO compact UL MAP IE" message for the operation of the CSM method.

The "MIMO compact UL IE" message uses a 'compact UL-MAP IE for normal subchannel' for allocating the conventional art subchannel and a 'compact UL-MAP IE for band AMC' for allocating the band AMC. Because the same subchannel (uplink resource) should be allocated according to characteristics of the CSM, as shown in FIG. 10, the HARQ MAP allocates the same subchannel to two channels having a different connection factor (RCID), respectively. Moreover, in order to provide a function of the allocated region, the 'MIMO compact UL IE for collaborative SM' is attached to a position subsequent to the subchannel for use. A value of 'CSM_control' is differentiated according to the number of antennas in each terminal. That is, when each terminal uses only one antenna, the pilot pattern used by the two terminals is divided into A and B. When each terminal uses two antennas, A and B are allocated to one terminal and C and D are allocated to the other terminal.

TABLE 7

| Syntax | Size (bits) | Notes |
|---|---|---|
| MIMO_compact UL-map IE( ){ | | |
| Compact UL-MAP | 3 | Type = 7 |
| UL-MAP Sub-type | 5 | CSM = 0x02 |
| Length | 4 | Length of the IE in Bytes |
| RCID_num | 1 | Number of CID allocated into the same region |
| For(i=0; i<RCID_num: i++){ | | |
| RCID_IE | variable | |
| CSM control | 1 | For Collaborative SM capable MSS with one antenna<br>0: pilot pattern A<br>1: pilot pattern B |

TABLE 7-continued

| Syntax | Size (bits) | Notes |
| --- | --- | --- |
|  |  | For Collaborative SM capable MSS with dual antennas<br>    0: pilot pattern A, B<br>    1: pilot pattern C, D |
|   Num_layer | 1 | 00: 1 layer<br>01: 2 layer |
|   For(i=0; i<Num_layer;i++){ |  | This loop specifies the Nep for layer 2 and above when required for STC. The same Nsch and RCID applied for each layer |
|     If(H-ARQ Mode = CTC Incremental Redundancy) {Nep}<br>    Elseif (H-ARQ Mode = Generic Chase) {UIUC}<br>  } | 4 | H-ARQ Mode is specified in the H-ARQ compact_UL_Map IE format for Switch H-ARQ Mode |
|   Padding<br>} | variable |  |

FIG. 11 illustrates an operation of the CSM method using the HARQ-MAP according to an embodiment of the present invention. Table 8 shows a data format of the "MIMO compact UL MAP IE" message.

The "MIMO compact UL MAP IE" message uses a 'compact UL-MAP IE for normal subchannel' for allocating the subchannel and a 'compact UL-MAP IE for band AMC' for allocating the band AMC. Because the same subchannel (uplink resource) should be allocated according to characteristics of the CSM, as shown in FIG. 11, the HARQ-MAP uses two separate IEs so as to allocate the same subchannel to two terminals having a different connection factor (RCID), respectively. Furthermore, in order to allocate a function of the allocated region, the 'MIMO compact UL IE for collaborative SM' is separately attached to a position subsequent to the two IEs. A value of 'CSM_control' is differentiated according to the number of antennas of each terminal. That is, when each terminal uses only one antenna, the pilot pattern used by the two terminals is divided into A and B. When each terminal uses two antennas, A and B are allocated to one terminal and C and D are allocated to the other terminal.

TABLE 8

| Syntax | Size (bits) | Notes |
| --- | --- | --- |
| MIMO_compact UL-map IE( ){ |  |  |
|   Compact UL-MAP | 3 | Type = 7 |
|   UL-MAP Sub-type | 5 | CSM = 0x02 |
|   Length | 4 | Length of the IE in Bytes |
|   CSM control | 1 | For Collaborative SM capable MSS with one antenna<br>    0: pilot pattern A<br>    1: pilot pattern B<br>For Collaborative SM capable MSS with dual antennas<br>    0: pilot pattern A, B<br>    1: pilot pattern C, D |
|   Num_layer | 1 | 00: 1 layer<br>01: 2 layer |
|   For(i=0; i<Num_layer;i++){ |  | This loop specifies the Nep for layer 2 and above when required for STC. The same Nsch and RCID applied for each layer |
|     If(H-ARQ Mode = CTC Incremental Redundancy) {Nep}<br>    Elseif (H-ARQ Mode = Generic Chase) {UIUC}<br>  } | 4 | H-ARQ Mode is specified in the H-ARQ compact_UL_Map IE format for Switch H-ARQ Mode |
|   Padding<br>} | variable |  |

Two terminals supporting the CSM method use SM and STTD methods, respectively.

Explaining it briefly, for example, assuming that one terminal using two antennas transmits data through the same data region, when the terminal uses the SM method, the two antennas simultaneously send signals, respectively, and the base station receives each signal represented by [Equation 6]. Therefore, when the base station detects each signal, a power control is required.

$$r = h_1 \cdot s_1 + h_2 \cdot s_2 + n \quad \text{[Equation 6]}$$

When the terminal uses the STTD method, at first (i.e., in time1, the two antennas transmit $s_1$, $s_2$ respectively. Next (i.e., in time2), the two antennas transmit—$s^*_2$, $s^*_1$, respectively. The signals received in the base station can be seen in [Equation 7].

$$r_{time1} = h_1 \cdot s_1 + h_2 \cdot s_2 + n$$

$$r_{time2} = h_1 \cdot (-s^*_2) + h_2 \cdot s^*_1 + n \quad \text{[Equation 7]}$$

Here, assuming that noise is as tiny as being ignored, two unknown transmission signals, as shown in [Equation 8], can be detected by using two known reception signals. As a result, there is not any reason to use specific power for the detection.

$$\hat{s}_1 = h^*_1 \cdot r_{time1} + h_2 \cdot r^*_{time2}$$

$$\hat{s}_2 = h^*_2 \cdot r_{time1} + h_1 \cdot r^*_{time2} \quad \text{[Equation 8]}$$

Thus, when two terminals with two antennas transmit data through the same data region, the CSM method may be used. In other words, four data can be detected by using power control in the SM method, while four transmission signals can be detected by using four reception signals in the STTD method.

As described above, an uplink capacity can be increased without an additional frequency bandwidth by embodying a method in which more than two users use a radio resource allocated to one user. Furthermore, limited radio resources can be utilized more efficiently by allocating a radio resource, which should have been allocated to an uplink, to a downlink, as assigning parts of time assigned to the uplink to the downlink in a TDD method.

The present invention can save the uplink radio resource by allocating the uplink resource to two terminals, and also be applied to both an current resource allocation and the HARQ.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of allocating a radio resource in a wireless communication system utilizing orthogonal frequency division multiplexing, the method comprising:
   receiving data associated with a radio resource allocation map from a base station, wherein the radio allocation map comprises control parameters for transmitting uplink data to the base station, wherein at least one of the control parameters comprises an orthogonal pilot pattern indicator for using orthogonal pilot patterns associated with supporting dual transmission by at least one mobile station, the orthogonal pilot patterns comprising a minus pilot and a plus pilot being used for an uplink basic allocation unit; and
   transmitting uplink data to the base station by the mobile station using the orthogonal pilot patterns, wherein the uplink data in the uplink basic allocation unit are at least one of:
   a first tile comprising the plus pilot located at a lower left corner of the tile, the minus pilot located at an upper right corner of the tile, and a null subcarrier located at an upper left corner of the tile and a lower right corner of the tile; and
   a second tile comprising the minus pilot located at an upper left corner of the tile, the plus pilot located at a lower right corner of the tile, and a null subcarrier located at a lower left corner of the tile and an upper right corner of the tile.

2. The method of claim 1, wherein each one of the orthogonal pilot patterns comprises the plus pilot and the minus pilot located at each diagonal corner of the uplink basic allocation unit.

3. The method of claim 2, wherein the plus pilot and the minus pilot have opposite phases.

4. The method of claim 1, wherein information associated with the orthogonal pilot patterns is communicated to the mobile station using a map information element.

5. The method of claim 1, wherein information associated with the orthogonal pilot patterns is communicated to the mobile station using a HARQ map information element.

6. The method of claim 1, wherein the dual transmission is achieved by using at least two antennas in the mobile station.

7. The method of claim 1, wherein the uplink data comprises at least two sets of data spatially multiplexed onto the same subchannel by using the orthogonal pilot patterns.

8. A method of allocating a radio resource in a wireless communication system utilizing orthogonal frequency division multiplexing, the method comprising:
   receiving data associated with a radio resource allocation map from a base station, wherein the radio allocation map comprises an orthogonal pilot pattern indicator for using orthogonal pilot patterns associated with supporting dual transmission by at least one mobile station, the orthogonal pilot patterns comprising at least one of:
   a first pilot pattern comprising a plus pilot located at a lower left corner of a tile, and a minus pilot located at an upper right corner of the tile; and
   a second pilot pattern comprising a minus pilot located at an upper left corner of a tile, and a plus pilot located at a lower right corner of the tile.

9. The method of claim 8, wherein the plus pilot and the minus pilot have opposite phases.

10. The method of claim 8, wherein information associated with the orthogonal pilot patterns is communicated to the mobile station using a map information element.

11. The method of claim 8, wherein information associated with the orthogonal pilot patterns is communicated to the mobile station using a HARQ map information element.

* * * * *